United States Patent
Holzbauer et al.

(10) Patent No.: US 10,499,758 B2
(45) Date of Patent: Dec. 10, 2019

(54) MODULAR SIEVE AND JUICING APPARATUS

(71) Applicant: KONINKLIJKE PHILIPS N.V., Eindhoven (NL)

(72) Inventors: Juergen Holzbauer, Eindhoven (NL); Stefan Sauer, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 350 days.

(21) Appl. No.: 15/512,945

(22) PCT Filed: Aug. 18, 2015

(86) PCT No.: PCT/EP2015/068921
§ 371 (c)(1),
(2) Date: Mar. 21, 2017

(87) PCT Pub. No.: WO2016/045876
PCT Pub. Date: Mar. 31, 2016

(65) Prior Publication Data
US 2017/0295982 A1    Oct. 19, 2017

(30) Foreign Application Priority Data
Sep. 23, 2014  (EP) ..................... 14186043

(51) Int. Cl.
| | |
|---|---|
| A47J 19/00 | (2006.01) |
| A23N 1/00 | (2006.01) |
| A47J 19/02 | (2006.01) |
| A23N 1/02 | (2006.01) |
| A47J 19/06 | (2006.01) |
| B04B 3/08 | (2006.01) |

(52) U.S. Cl.
CPC ............. *A47J 19/02* (2013.01); *A23N 1/02* (2013.01); *A47J 19/027* (2013.01); *A47J 19/06* (2013.01); *B04B 3/08* (2013.01)

(58) Field of Classification Search
CPC .. A23N 1/02; A23N 1/00; A47J 19/027; A47J 19/00; A47J 43/25; B04B 3/08; B02C 18/0084
USPC ........ 99/513, 510; 210/173, 174, 240, 360.1
See application file for complete search history.

(56) References Cited

U.S. PATENT DOCUMENTS

| | | | | |
|---|---|---|---|---|
| 4,614,153 | A * | 9/1986 | Kurome | A47J 19/027 99/511 |
| 6,579,458 | B2 * | 6/2003 | Mickelat | D21D 5/16 210/232 |
| 8,091,473 | B2 * | 1/2012 | Kim | A47J 19/06 99/510 |

FOREIGN PATENT DOCUMENTS

| | | |
|---|---|---|
| CN | 201578022 U | 9/2010 |
| CN | 201675722 U | 12/2010 |
| CN | 202515359 U | 11/2012 |
| CN | 202537097 U | 11/2012 |

(Continued)

*Primary Examiner* — Reginald Alexander

(57) ABSTRACT

A modular sieve (100) for a juicing apparatus is disclosed that comprises a first module (110) comprising a pattern of first protrusions (112) having first edge regions (113); and a second module (120) comprising a pattern of second protrusions (122) having second edge regions (123) for adjoining neighbouring first edge regions when the first module is engaged with the second module, wherein each first edge region and an adjoining second edge region delimit a plurality of apertures (150) for passing juice. A juicing apparatus including such a modular sieve is also disclosed.

18 Claims, 8 Drawing Sheets

(56) References Cited

FOREIGN PATENT DOCUMENTS

| | | | |
|---|---|---|---|
| CN | 202760963 U | 3/2013 | |
| DE | 1174948 B | 7/1964 | |
| DE | 3919971 A1 | 2/1990 | |
| DE | 4428922 A1 * | 2/1996 | ............ A47J 19/027 |
| EP | 2494893 A1 | 9/2012 | |
| GB | 2224456 A | 5/1990 | |
| JP | 2003259969 A | 9/2003 | |
| WO | 2013011429 A1 | 1/2013 | |
| WO | 2013011430 A1 | 1/2013 | |

* cited by examiner

MODULAR SIEVE AND JUICING APPARATUS

This application is the U.S. National Phase application under 35 U.S.C. § 371 of International Application No. PCT/EP2015/068921, filed on Aug. 18, 2015 which claims the benefit of International Application No. 14186043.7 filed on Sep. 23, 2014. These applications are hereby incorporated by reference herein.

FIELD OF THE INVENTION

The present invention relates to a modular sieve for a juicing apparatus, wherein the modular sieve comprises a first module and a second module for engaging with the first module to form the modular sieve.

The present invention further relates to a juicing apparatus including such a modular sieve.

BACKGROUND OF THE INVENTION

In modern society, there is a drive towards healthy living. To this end, many consumers tend to consume fresh produce as part of a healthy diet. An example of such fresh produce is juice freshly extracted from juice-containing food products such as fruit and vegetables. Such fresh juice may be produced using a juicing apparatus, in which a shredding element may be present to shred the food product, which shredding element cooperates with a sieve for extracting the juice from the shredded food product. Such freshly extracted juice is perceived to be healthier and better tasting than the commercially available packaged juices, which may be less fresh and may contain undesirable additives such that the juice no longer is considered pure juice.

However, one of the main disincentives for regularly using such a juicing apparatus is the cleaning process. In particular, the sieve is notoriously difficult to clean, as solid parts of the juiced food products, e.g. pulp, may get stuck in the apertures of the sieve and may be difficult to dislodge from such a sieve, for instance because the apertures are too small for a cleaning brush or pad to easily penetrate the apertures. This cumbersome cleaning process commonly dissuades a person from using the juicing apparatus.

For instance, GB 2,224,456 B discloses a centrifugal force juice extractor comprising rotatable straining means arranged in a juice collector, wherein the straining means comprises a pair of coaxially arranged straining baskets each having a plurality of wall members with spaces therebetween, the wall members of one basket registering with the spaces of the other basket in such a way as to define straining slots between adjacent wall members. In the operational state, wall members of one straining basket, e.g. an inner basket, register with the spaces between the wall members of the other straining basket, e.g. an outer basket, to form straining slots. After the juice extraction process has ended, the baskets may be separated from each other for cleaning purposes. However, it has been found that the spaces in between the wall members may be difficult to clean; in particular, such spaces can only be cleaned using a cleaning utensil such as a brush or the like due to the fact that these spaces are largely enclosed, which can be cumbersome and potentially hazardous because the baskets may need to be repeatedly handled in order to provide manual access to all its spaces.

SUMMARY OF THE INVENTION

The present invention seeks to provide a modular sieve for a juicing apparatus that may be cleaned more easily.

The present invention further seeks to provide a juicing apparatus including such a modular sieve.

According to an aspect, there is provided a modular sieve for a juicing apparatus, the sieve comprising a first module comprising a pattern of first protrusions having first edge regions; and a second module comprising a pattern of second protrusions having second edge regions for adjoining neighbouring first edge regions when the first module is engaged with the second module, wherein each first edge region and an adjoining second edge region delimit a plurality of apertures for passing juice.

The provision of apertures or holes for the juice to pass that are delimited, i.e. have a perimeter defined, by adjoining edge regions of protrusions of cooperating modules of the sieve, i.e. apertures that are only closed or complete when the modules engage to form the sieve, allow for easier cleaning of the sieve in disengaged form because the perimeter of the aperture is divided over multiple edge portions, i.e. edge portions of different modules. Consequently, when the sieve is disengaged or disassembled, each aperture is opened up because each module contains only part of the aperture, which part may be easily cleaned without requiring cleaning utensils, e.g. by rinsing, thereby facilitating the sieve cleaning process and reducing the amount of handling required for each module during the cleaning process.

Each first edge region may comprise a plurality of cut-outs, said cut-outs partially delimiting said apertures. This facilitates easy cleaning of the first edge regions as the cut-outs can be readily rinsed, in particular when said cut-outs have a step shape or a hemispherical shape.

Each second edge region may comprise a plurality of further cut-outs, wherein each aperture is delimited by one of said cut-outs and one of said further cut-outs when the first module is engaged with the second module. This further facilitates cleaning of the sieve. Said further cut-outs may have the same shape as the cut-outs to create a symmetrical, i.e. regular, aperture, which may aid the juicing process.

In an embodiment, the first and second protrusions are tapered to increase the overall length of the adjoining edge regions of the assembled modular sieve, which facilitates an increase in the porosity of the modular sieve as more apertures may be defined by the adjoining edge regions.

In an embodiment, the respective patterns are wave patterns. This is a particularly suitable pattern as it further increases the total length of the edge regions of the respective modules, such that the porosity of the sieve may be increased to facilitate a higher juice output rate during the juicing process.

The second module may further comprise a plurality of first further protrusions opposite the second protrusions, each of the first further protrusions having a first further edge region, wherein the modular sieve may further comprise a third module comprising a pattern of second further protrusions having second further edge regions for adjoining neighbouring first further edge regions when the second module is engaged with the third module, wherein each first further edge region and an adjoining second further edge region delimit a plurality of further apertures for passing juice. The addition of further modules to the modular sieve increases the porosity of the sieve and therefore increases the rate at which juice may be generated through the modular sieve when in use in a juicing apparatus.

The second protrusions and the first further protrusions may have the same shape.

The first protrusion may comprise a first rib adjacent to the first edge region and/or the second protrusion may comprise a second rib adjacent to the second edge region for reducing the amount of food pulp being able to get into the apertures 150 during operation of a juicing apparatus including the assembled modular sieve.

The modular sieve may further comprise a supporting cage for holding the respective modules. This increases the stability of the modular sieve when assembled within the cage, as the cage prevents the various modules from laterally separating from each other.

According to another aspect, there is provided a juicing apparatus comprising the modular sieve according to any of the above embodiments. Such a juicing apparatus benefits from being easier to clean, which is likely to improve the customer satisfaction of such an apparatus.

In an embodiment, the juicing apparatus is a horizontal masticating juicer.

In an alternative embodiment, the juicing apparatus is a vertical masticating juicer.

BRIEF DESCRIPTION OF THE DRAWINGS

Embodiments of the invention are described in more detail and by way of non-limiting examples with reference to the accompanying drawings, wherein.

DETAILED DESCRIPTION OF EMBODIMENTS

Figure 1:
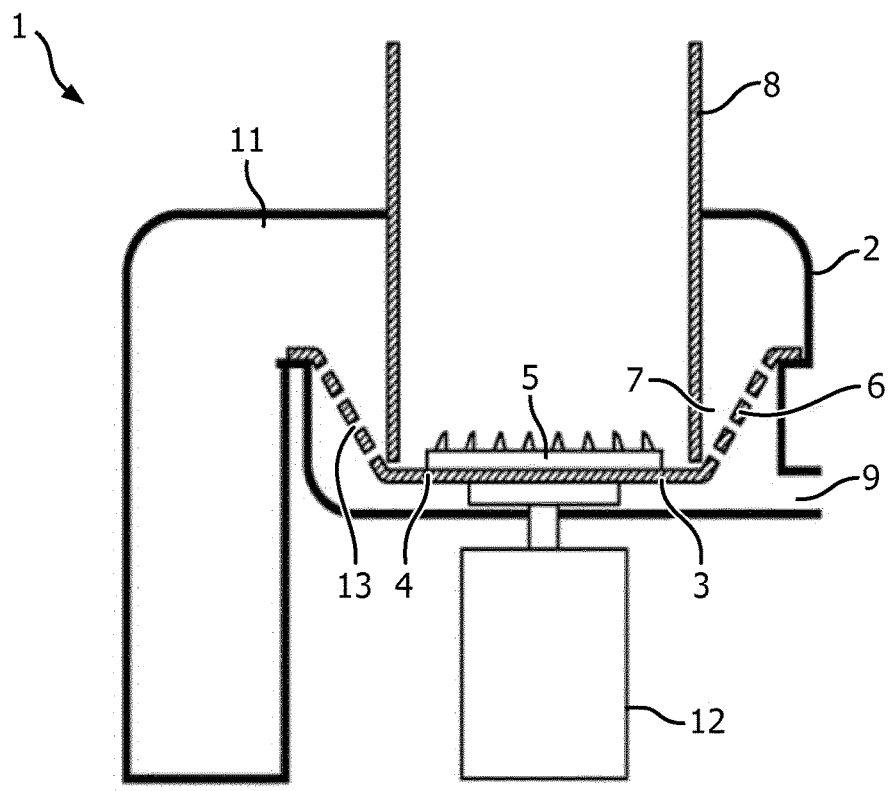
FIG. 1 schematically depicts an aspect of a prior art juicing apparatus.

It should be understood that the Figures are merely schematic and are not drawn to scale. It should also be understood that the same reference numerals are used throughout the Figures to indicate the same or similar parts.

FIG. 1 schematically depicts a known juicing apparatus 1, here a centrifugal juicing apparatus. Such a juicing apparatus 1 comprises a housing 2 with a rotating body 3 which is rotatably mounted in the housing 2. The rotating body 3 comprises a base 4, a grater 5 mounted on an upper surface of the base 4 and a sieve 6 upstanding around the periphery of the base 4 and diverging outwardly in a conical shape to form a fruit or vegetable receiving chamber 7. A cylindrical guide 8 feeds fruit into the chamber 7, a juice outlet 9 is formed around the outer face of the sieve 6 to receive juice urged through the sieve 6, and a pulp outlet 11 is formed at the upper end of the sieve 6 to receive pulp urged from the chamber 7.

When the rotating body 3 is rotated by a motor 12, the sieve 6 and grater 5 are rotated. A fruit or vegetable inserted into the juicer is guided by the guide 8 onto the grater 5 and reduced to pulp and juice. The pulp and juice is then urged radially outwards by the centrifugal force of the rotating body 3. The sieve 6 has a plurality of perforations or holes 13 in it through which juice is urged to flow, but the pulp is retained in the body 3 so that the juice separated from the pulp and flows into the juice outlet 9. The pulp retained in the chamber 7 and is urged upwardly towards the pulp outlet 11.

As previously explained, a particular drawback of such a juicing apparatus 1 is the difficulty associated with cleaning the sieve 6. Embodiments of the present invention seek to provide a modular sieve for the juicing apparatus 1 or indeed for any other suitable type of juicing apparatus comprising a rotating or stationary sieve, e.g. any suitable horizontal or vertical masticating juice apparatus with a rotating auger and a stationary sieve, which modular sieve may be cleaned with less effort and without requiring cleaning utensils such as cleaning brushes.

Figure 2:
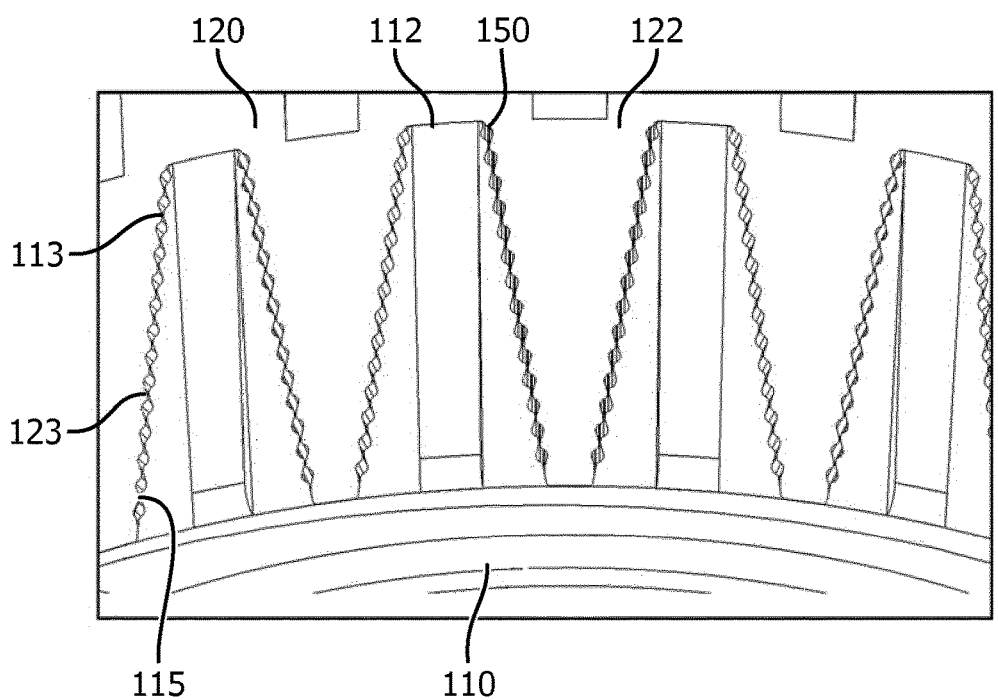
FIG. 2 schematically depicts part of a modular sieve according to an embodiment.

FIG. 2 schematically depicts an aspect of a modular sieve 100 according to an embodiment for use in such juicing apparatuses. The modular sieve 100 comprises a first module 110 including a plurality of first protrusions 112 extending from a main body of the first module 110 and a second module 120 including a plurality of second protrusions 122 extending from a main body of the second module 120. The first protrusions 112 and the second protrusions 122 are shaped such that these protrusions interleave when the first module 110 is engaged with the second module 120. In other words, the first edge regions 113 of the first protrusions 112 and the second edge regions 123 of the second protrusions 122 cooperate with each other in an adjoining fashion, thereby defining a boundary line 115.

Figure 3:
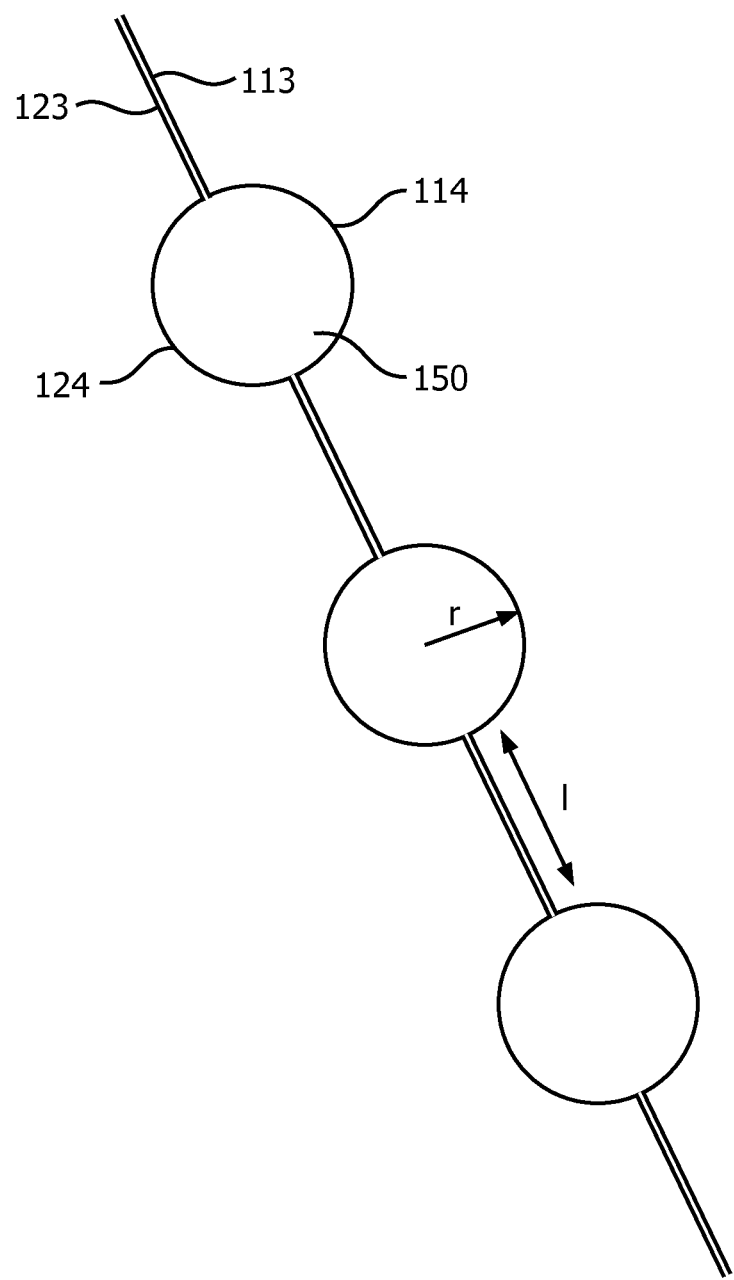
FIG. 3 schematically depicts an aspect of the part of FIG. 2.

This is more clearly depicted in FIG. 3, which schematically depicts a first edge region 113 of a first protrusion 112 in an engagement with a second edge region 123 of a second protrusion 122. In this embodiment, the first edge region 113 comprises a plurality of hemispherical cutouts 114 and the second edge region 123 comprises a plurality of hemispherical further cutouts 124, with the cutouts 114 and further cutouts 124 for combining to define a plurality of circular apertures 150 on the boundary line 115 between the first edge portion 113 and the second edge portion 123. In other words, the apertures 150 are delimited in part by the cutouts 114 and in part by the further cutouts 124, such that the apertures 150 only exist as such when the first module 110 is engaged with the second module 120.

Upon separating the first module 110 from the second module 120, the apertures 150 will be decomposed into the cutouts 114 on the first edge regions 113 and the further cutouts 124 on the second edge regions 123 respectively, which cutouts may be cleaned by simply rinsing the first module 110 and the second module 120, due to the fact that the apertures 150 are decomposed into open structures, i.e. aperture portions that are not substantially enclosed, which means that food pulp, i.e. food fibers and the like, are unlikely to get stuck.

At this point it is noted that in FIG. 3, both the first edge regions 113 and the second edge regions 123 comprise cutouts by way of non-limiting example only. It is for instance equally feasible that one of the first protrusions 112 and the second protrusions 122 contains a continuous edge region, such that the apertures 150 will be delimited by a cutout on one of the edge regions and a continuous or straight portion of an adjoining edge region. Moreover, the cutouts 114 and the further cutouts 124 are shown to have a hemispherical shape by way of non-limiting example only.

Figure 4:
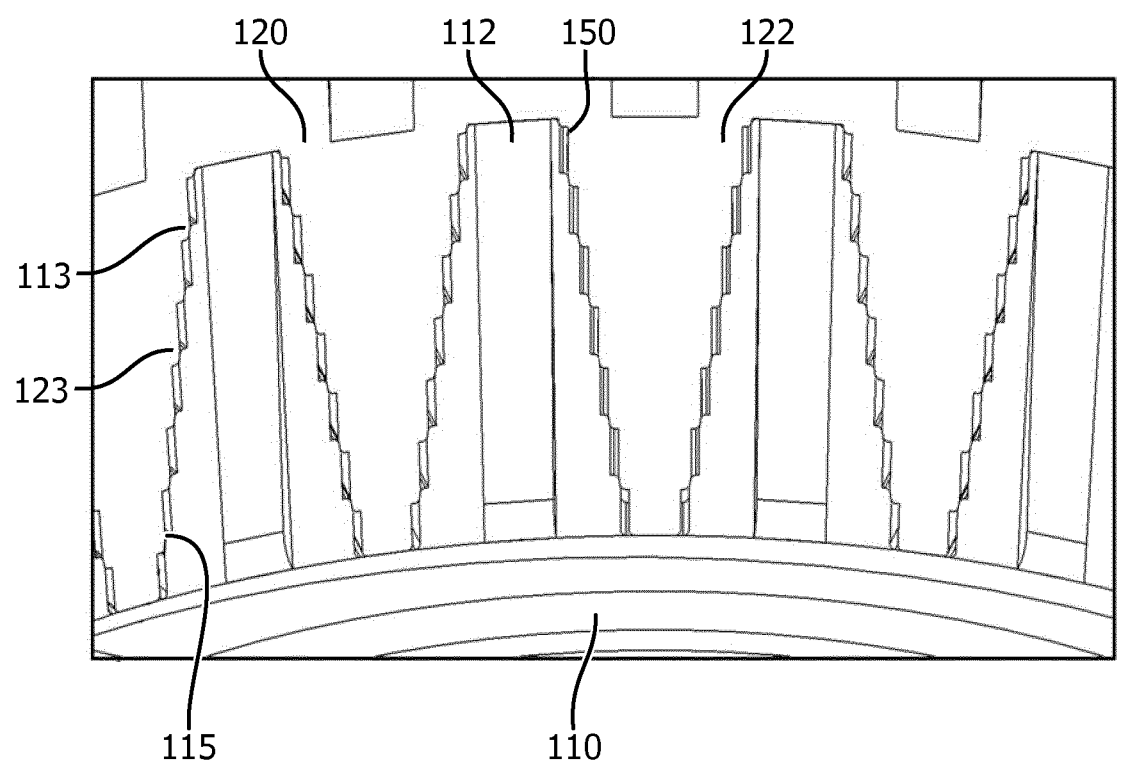
FIG. 4 schematically depicts part of a modular sieve according to another embodiment.

It should be understood that the cutouts may have any suitable shape, and that the cutouts 114 may have the same shape or a different shape as the further cutouts 124. For example, FIG. 4 schematically depicts an aspect of a modular sieve 100 according to an alternative embodiment, in which the hemispherical cutouts on the first edge regions 113 of the first protrusions 112 and on the second edge regions 123 of the second protrusions 122 are replaced by stepped cutouts such that oblong apertures 150, e.g. rectangular or square apertures 150, are formed when the first edge regions 113 adjoin the second edge regions 123 when the first module 110 is engaged with the second module 120.

Upon returning to FIG. 3, the cutouts 114 and further cutouts 124 may have any suitable dimension for preventing food pulp passing through the modular sieve 100 when assembled and in use. For instance, in case of a hemispherical cutout, the cutout may have a radius r in the range of 0.1-0.3 mm, e.g. about 0.1 or 0.2 mm. Neighboring cutouts may be spaced apart by a distance 1, which may be chosen in combination with the aforementioned radius in order to define the porosity of the modular sieve 100 when assembled. For instance, the porosity of the modular sieve 100 may be increased by reducing the distance 1 and decreased by increasing the distance 1. In an embodiment, r=1. In an alternative embodiment, r<1. In yet another embodiment, r>1. In the context of the present application, the porosity of the modular sieve 100 is defined as the percentage of the total surface area of the modular sieve 100 through which juice can escape the modular sieve 100, i.e. the part of the total surface area defined by the apertures 150.

Upon returning to FIG. 2, it is noted that the porosity of the modular sieve 100 when assembled may be increased by choosing the shape of the first protrusions 112 of the first module 110 and the second protrusions 122 of the second module 120 such as to increase the overall length of the boundary 115 between the first edge regions 113 and the second edge regions 123. In an embodiment, the first protrusions 112 may taper from the main body of the first module 110 and the second protrusions 122 may taper from the main body of the second module 120 in order to increase the length of the boundary 115.

Figure 5:
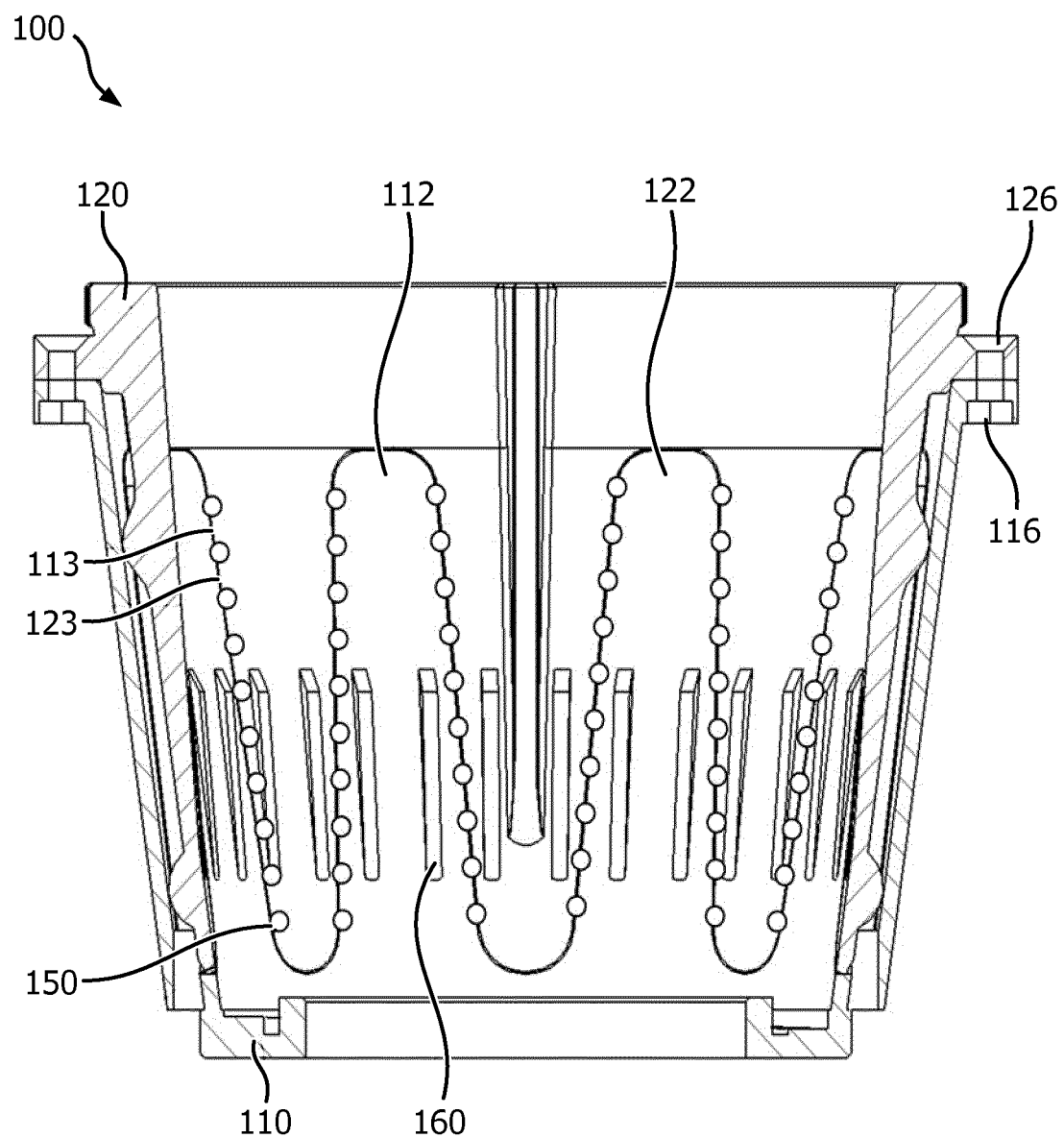
FIG. 5 schematically depicts a cross-section of a modular sieve according to an embodiment.

In a particularly advantageous embodiment, which is schematically depicted in FIG. 5, the first protrusions 112 and the second protrusions 122 are each shaped to define a wave pattern of protrusions 150, wherein the overall shape of the first protrusions 112 and the second protrusions 122 respectively defines such a wave, e.g. a sinusoidal wave to further increase the length of the boundary 115. It will be apparent that the wave pattern defined by the first protrusions 112 should be complementary to the wave pattern defined by the second protrusions 122 such that these protrusions can engage with each other to define the boundary line 115 as previously explained.

As shown in FIG. 5, the first module 110 may further comprise a first alignment member 116 and the second module 120 may further comprise a second alignment member 126, wherein the first alignment member 116 and the second alignment member 126 are designed to engage with each other when the first module 110 is engaged with the second module 120. This for instance may reduce the risk of or may even prevent accidental displacement of the second module 20 relative to the first module 110, i.e. the accidental disassembling of the modular sieve 100. To this end, one of the first alignment member 116 and the second alignment member 126 may comprise a protrusion for engaging with a receptacle on the other of the first alignment member 116 and the second alignment member 126, wherein a tight fit between the protrusion and a receptacle may be established during engagement such that a certain amount of force will be required to separate the first module 110 from the second module 120. Other suitable arrangements of fixating the first module 110 and the second module 120 relative to each other will be immediately apparent to the skilled person.

In FIG. 5, the first module 110 and the second module 120 furthermore comprise a plurality of ribs 160 that align to form a pattern of ribs 160 when the first module 110 is engaged with the second module 120. Such ribs 160 are for instance of particular advantage when used on a stationary sieve for a masticating juicer. The ribs 160 may be located on the inner surface of the modular sieve 100 when assembled. The ribs 160 may assist in preventing food pulp from following the rotation of the rotating auger during the juicing process in such masticating juicers, thereby reducing the pollution of the apertures 150 with such pulp and assisting in the transport of the pulp in an axial direction, i.e. along the ribs 160, e.g. towards a pulp outlet of the juicing apparatus. This therefore further increases the ease of cleaning of the first module 110 and the second module 120.

At this point, it is noted that the modular sieve 100 is not necessarily limited to a pair of modules, i.e. to first module 110 and second module 120. In an embodiment, the modular sieve 100 may be extended by further modules, for instance to further increase the porosity of the modular sieve 100 or to at least increase the total number of apertures of the modular sieve 100 through which juice may escape.

Figure 6:
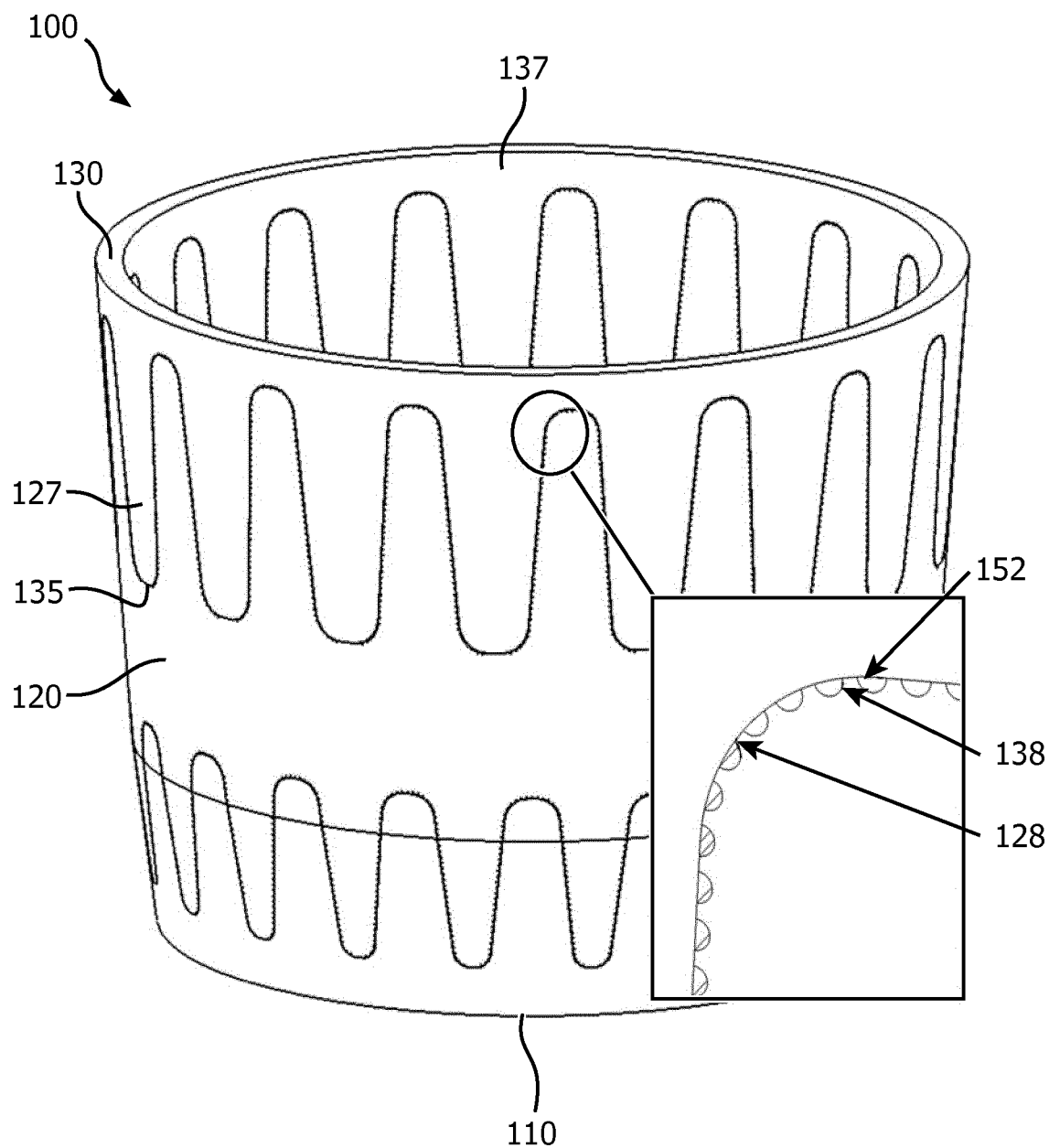
FIG. 6 schematically depicts a perspective view of a modular sieve according to a further embodiment.

An example embodiment of such a modular sieve 100 is schematically depicted in FIG. 6, in which a third module 130 is present for engaging with the second module 120. To this end, the second module 120 comprises a plurality of first further protrusions 127 opposite the second protrusions 122, i.e. extending in opposite directions from opposite regions of the main body of the second module 120. Each of the first further protrusions 128 has a first further edge region 128. The third module 130 comprises a pattern of second further protrusions 137 having second further edge regions 138 for adjoining neighbouring first further edge regions 128 when the second module 120 is engaged with the third module 130.

As shown in FIG. 6, the first further edge regions 128 comprise a plurality of cutouts that define a plurality of further apertures 152 when the second module 120 is engaged with the third module 130. In other words, the further apertures 152 are typically delimited by the first further edge regions 128 and the second further edge regions 138 when the second module 120 is engaged with the third module 130, whereas the further apertures 152 are decomposed as explained above when the third module 130 is separated from the second module 120.

In FIG. 6, only the first further edge regions 128 of the second module 120 contain cutouts by way of non-limiting example. It should be understood that it is equally feasible that only the second further edge regions 138 of the third module 130 contain such cutouts or that both the first further edge regions 128 and the second further edge regions 138 contain such cutouts, such that the apertures 152 are defined by respective cutouts on these edge regions as previously explained.

Moreover, in FIG. 6, the second protrusions 122 and the first further protrusions 127 have the same shape, e.g. a wave pattern shape, but it should be understood that it is equally feasible that the second protrusions 122 and the first further protrusions 127 have different shapes. It should furthermore be understood that further modules may be added to the modular sieve 100, for instance in accordance with the teachings of FIG. 6.

The respective modules of the modular sieve 100, e.g. the first module 110, the second module 120 and optional further modules such as the third module 130, may be made of any suitable material, preferably a material that is dishwasher safe. For example, suitable materials include plastics, metals or metal alloys such as stainless steel, and so on. The modules are preferably made of the same material although it is feasible that different modules are made of different materials.

Figure 7:
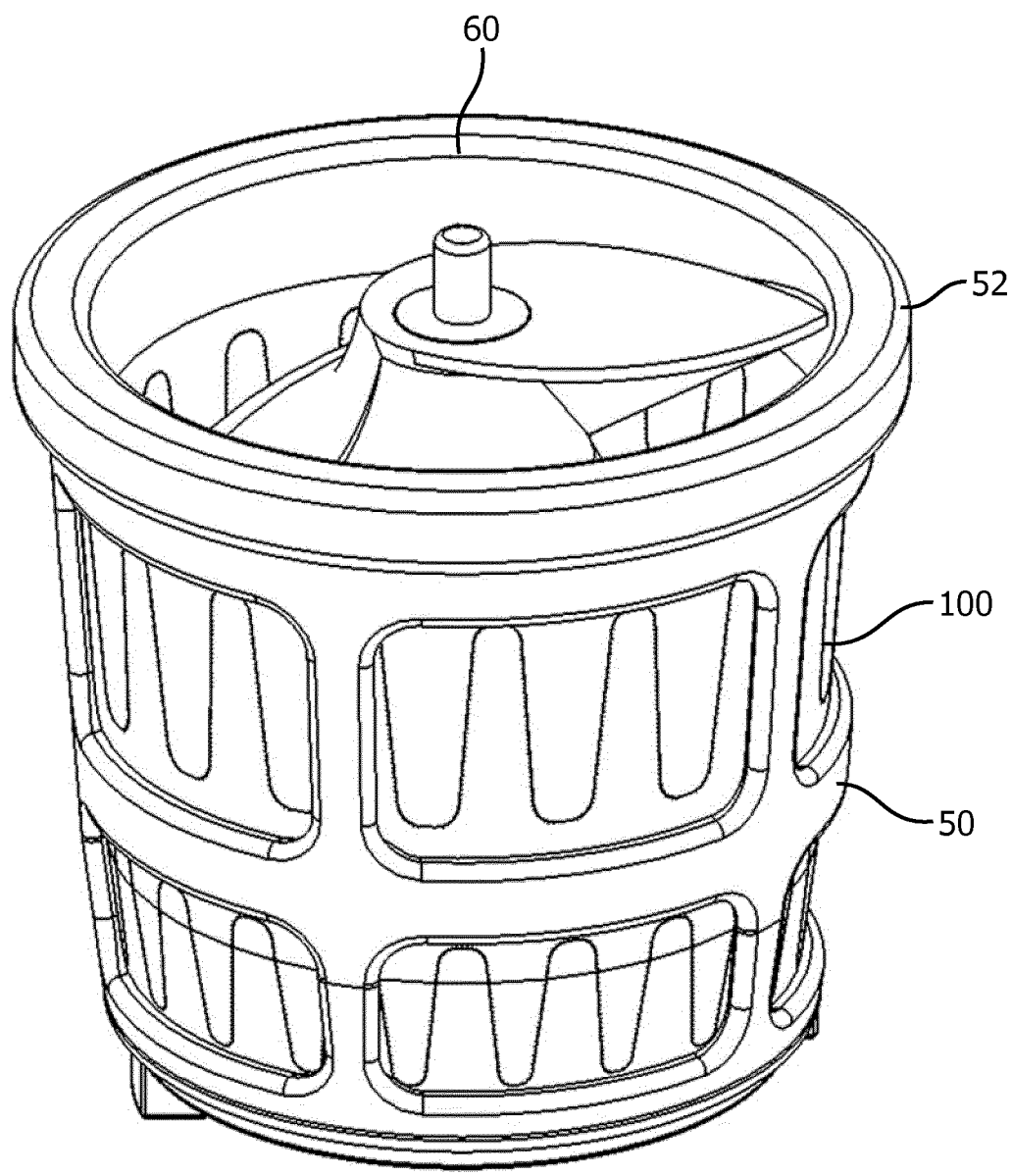
FIG. 7 schematically depicts a perspective view of a modular sieve according to a yet further embodiment.

In order to secure the various modules of the modular sieve 100 when assembling the modular sieve 100, the various modules may be placed in a basket 50 as schematically shown in FIG. 7. The basket 50 is typically dimensioned such that the various modules of the modular sieve 100 snugly fit into the basket 50, thereby preventing lateral displacement, e.g. accidental disengagement, of individual modules relative to each other. The basket 50 may optionally include a lid 52 for containing the various modules of the modular sieve 100 within the basket 50.

The basket 50 and optional lid 52 may be made of any suitable material, e.g. plastics, metals or metal alloys such as stainless steel, and so on. In an embodiment, the basket 50 and optional lid 52 are made of the same material as the various modules of the modular sieve 100. In FIG. 7, auger 60 is also shown; this auger may be inserted into the modular sieve 100 in case the modular sieve 100 is a stationary sieve for a masticating juicer as explained, in which case the auger 60 may engage with the motor 12 of the juicing apparatus 1 for rotating within the assembled modular sieve 100 during the juicing process performed with the juicing apparatus 1.

Figure 8:
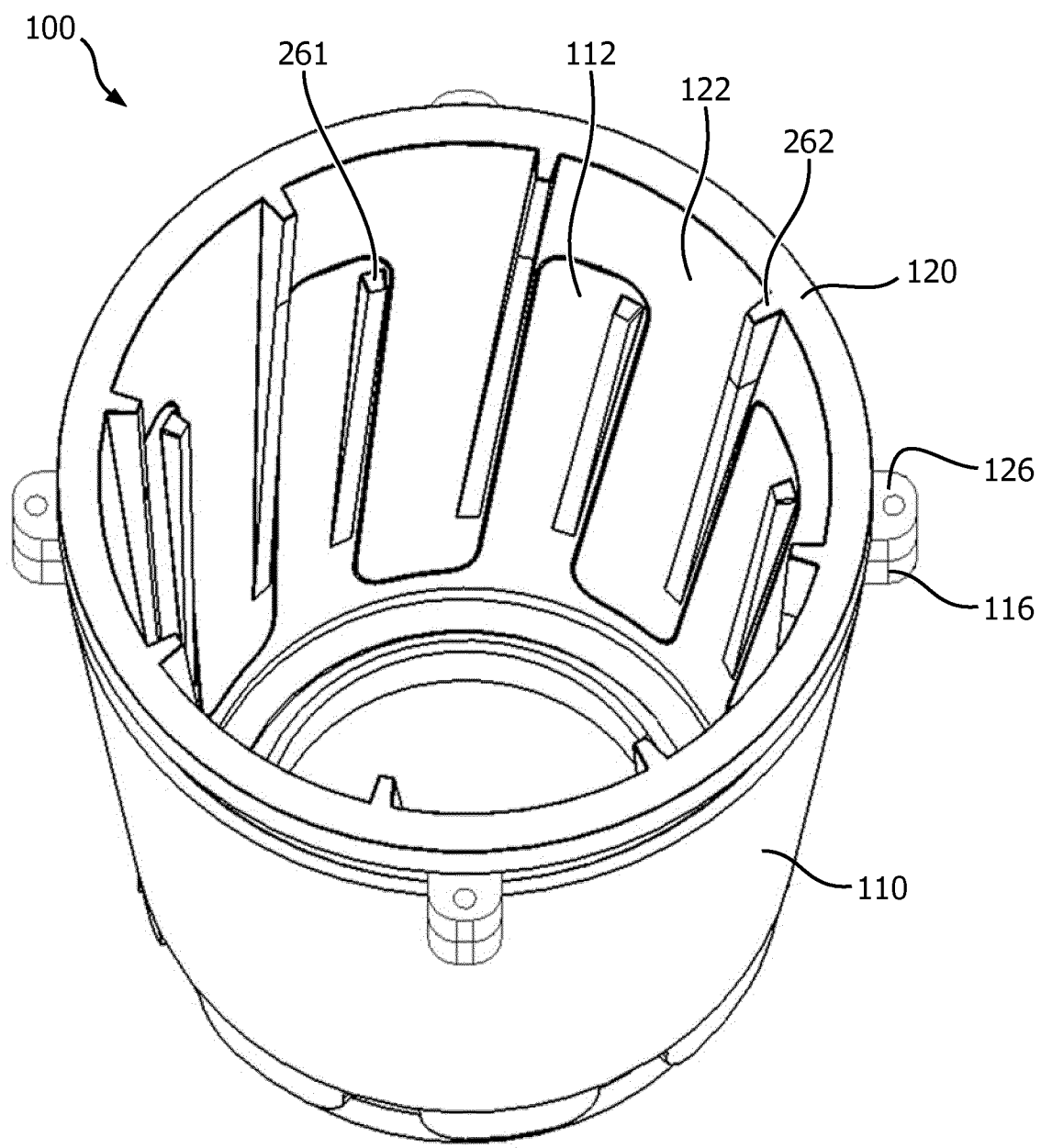
FIG. 8 schematically depicts a perspective view of a modular sieve according to yet another embodiment.

FIG. 8 schematically depicts an alternative embodiment of the modular sieve 100 as shown in FIG. 5, wherein the ribs 160 are replaced by first ribs 261 on the first protrusions 112 of the first module 110 and by second ribs 262 on the second protrusions 122 of the second module 120, wherein the first ribs 261 and the second ribs are positioned such that these ribs are positioned immediately in front of a section of the boundary line 115 defined by a first edge region 113 and an adjoining second edge region 123 when the first module 110 is engaged with the second module 120. It should be understood that "immediately in front" is used in the context of the direction of rotation of the auger 60 when mounted in the juicing apparatus 1.

In other words, during rotation of the auger 60 the aforementioned sections of the boundary line 115 are immediately behind, i.e. leeward or downstream, to one of the first ribs 261 and the second ribs 262. This largely prevents food pulp from entering the apertures 150, as the first ribs 261 and the second ribs 262 force the pulp over the apertures 150 during operation of the juicing apparatus 100, whereas juice can still escape the modular sieve 100 because of the pressure forces present during this operation. In addition, the ribs 261 and 262 assist in directing the pulp in an axial direction, e.g. towards a pulp outlet of the juicing apparatus.

Figure 9:
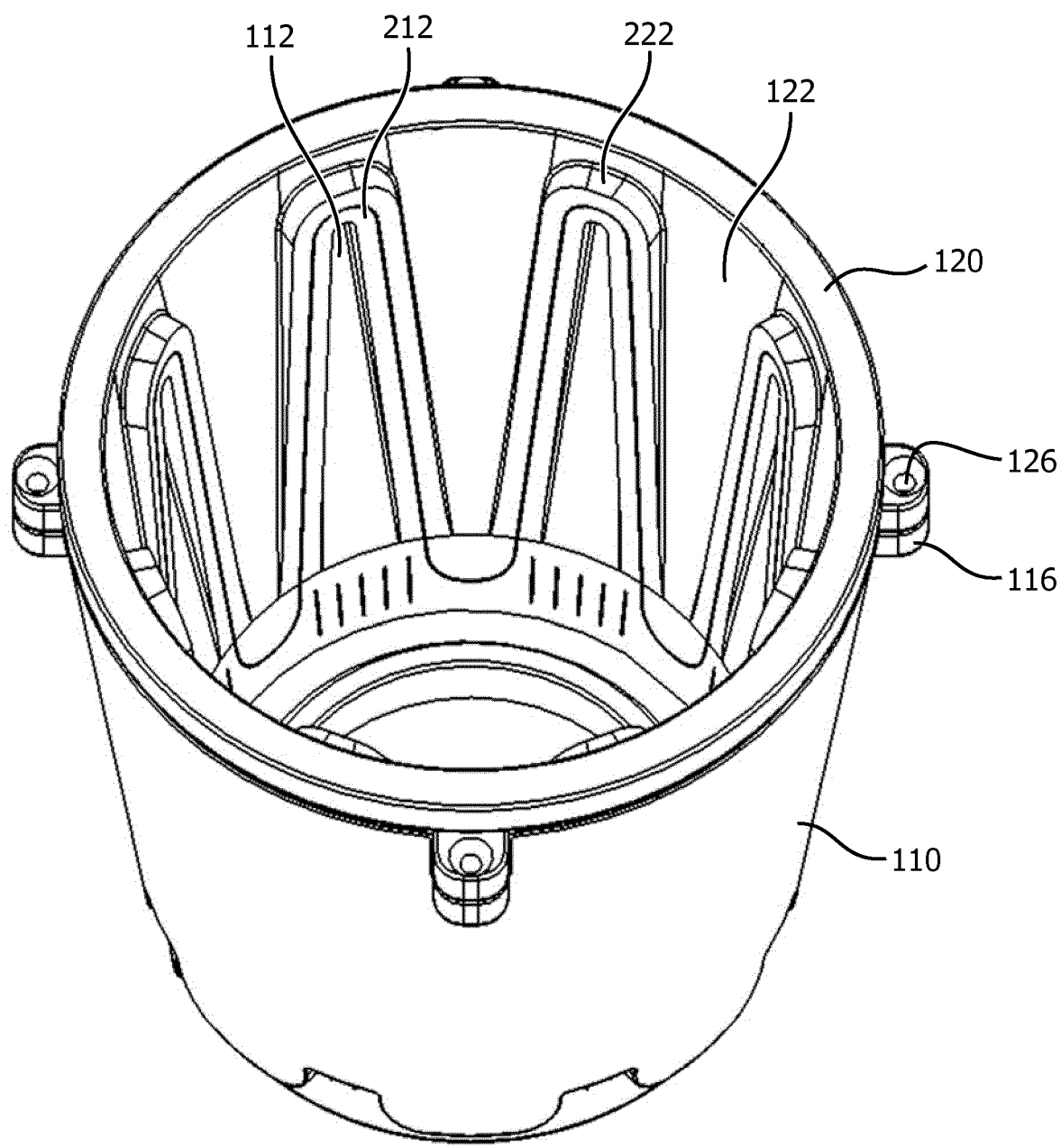
FIG. 9 schematically depicts a perspective view of a modular sieve according to a yet another embodiment.

FIG. 9 schematically depicts yet another alternative embodiment of the modular sieve 100 as shown in FIG. 5, wherein the ribs 160 are replaced by first ribs 212 along the edges of the first protrusions 112 and second ribs 222 along the edges of the second protrusions 122. In this embodiment, the boundary 115 is defined by the first ribs 212 adjoining the second ribs 222, thereby forming a boundary 115 that protrudes from the inner surface of the modular sieve 100. In this embodiment, the edge regions 113 and 123 form part of the first ribs 212 and the second ribs 222 respectively, such that the apertures 150 are delimited by the first ribs 212 and the second ribs 222. The amount of protrusion of the boundary 115 is determined by the height of the first ribs 212 and the second ribs 222. This height may be chosen such that the auger 60 scrapes the elevated boundary 115, such that food pulp, e.g. fibers, is scraped away by the auger 60. This therefore reduces the amount of food pulp getting stuck in the apertures 150, such that the first module 110 and the second module 120 may be more easily cleaned.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A modular sieve for a juicing apparatus, the sieve comprising:
   a first module comprising a pattern of first protrusions having first edge regions; and
   a second module comprising a pattern of second protrusions having second edge regions for adjoining neighbouring first edge regions when the first module is engaged with the second module, wherein each first edge region and an adjoining second edge region delimit a plurality of apertures for passing juice;
   wherein each first edge region comprises a plurality of cut-outs, said cut-outs partially delimiting said apertures.

2. The modular sieve of claim 1, wherein said cut-outs have a step shape.

3. The modular sieve of claim 1, wherein said cut-outs have a hemispherical shape.

4. The modular sieve of claim 1, wherein each second edge region comprises a plurality of further cut-outs, wherein each aperture is delimited by one of said cut-outs and one of said further cut-outs when the first module is engaged with the second module.

5. The modular sieve of claim 4, wherein said further cut-outs have the same shape as the cut-outs.

6. The modular sieve of claim 1, wherein the first protrusions are tapered.

7. The modular sieve of claim 1, wherein the respective patterns are wave patterns.

8. The modular sieve of claim 1, wherein the first protrusion comprises a first rib adjacent to the first edge region and/or the second protrusion comprises a second rib adjacent to the second edge region.

9. The modular sieve of claim 8, wherein the first rib adjoins the second rib when the first module is engaged with the second module, such that the apertures are delimited by the first rib and the second rib.

10. The modular sieve of claim 1, further comprising a supporting cage for holding the respective modules.

11. The modular sieve of claim 1, wherein the apertures have a maximum diameter or cross-section in the range of 0.1 -0.6 mm.

12. A juicing apparatus comprising the modular sieve of claim 1.

13. The juicing apparatus of claim 12, wherein the juicing apparatus is a vertical or horizontal masticating juicer.

14. A modular sieve for a juicing apparatus, the sieve comprising:
- a first module comprising a pattern of first protrusions having first edge regions; and
- a second module comprising a pattern of second protrusions having second edge regions for adjoining neighbouring first edge regions when the first module is engaged with the second module, wherein each first edge region and an adjoining second edge region delimit a plurality of apertures for passing juice,
- wherein the second module further comprises a plurality of first further protrusions opposite the second protrusions, each of the first further protrusions having a first further edge region;
- the modular sieve further comprising a third module comprising a pattern of second further protrusions having second further edge regions for adjoining neighbouring first further edge regions when the second module is engaged with the third module, wherein each first further edge region and an adjoining second further edge region delimit a plurality of further apertures for passing juice.

15. The modular sieve of claim 14, wherein the first protrusions are tapered.

16. The modular sieve of claim 14, wherein the respective patterns are wave patterns.

17. The modular sieve of claim 14, wherein the first protrusion comprises a first rib adjacent to the first edge region and/or the second protrusion comprises a second rib adjacent to the second edge region.

18. The modular sieve of claim 17, wherein the first rib adjoins the second rib when the first module is engaged with the second module, such that the apertures are delimited by the first rib and the second rib.

* * * * *